Patented Oct. 26, 1937

2,096,743

UNITED STATES PATENT OFFICE 2,096,743

METHOD OF TREATING CELLULOSIC MATERIALS

Max Henkels, Flushing, N. Y.

No Drawing. Application June 22, 1935,
Serial No. 27,874

25 Claims. (Cl. 18—47.5)

This invention is directed to a method for the formation of substances from naturally occurring cellulosic materials which are capable of being molded or formed into useful articles. More particularly, the present invention is directed to a method in which substances are formed directly from such materials which have suitable heat curing properties to allow the transformation thereof into permanently hard and tough materials by the application of heat and pressure.

In the present invention the starting materials are of cellulosic nature, such as are found in corn stalk, straw, peat, wood pulp, wood, and the like. Such cellulosic materials are generally associated or combined with lignins, pectins, pentosans, or similar or related compounds.

The present process is directed to the treatment of such material under such conditions as to transform the cellulose and those substances with which it is associated in nature into a composite substance suitable for molding. The treated material may be mixed with filling materials if desired and subjected to pressure in a mold to give the substance the desired form. The mold may then be subjected to a heat treatment, usually under pressure, to permanently harden the molded material. In my process there are, therefore three different groups of steps as follows:

1.—The preparation of the cellulose material.
2.—The molding thereof in suitable forms, and
3.—The heat treatment of the moldings.

The preparation of the cellulose material

Suitable cellulose material of the class above mentioned is disintegrated in a suitable machine to such a degree as to allow the subsequent handling in the procedure. The subdivided material is introduced into a mixing or kneading machine of the Werner and Pfleiderer type. This machine is steam jacketed and is equipped with a bottom outlet and a vapor tight cover with inlets for the introduction of the cellulose material and of liquids. It is also supplied with a vapor outlet connected to a condenser for the removal and condensation of gaseous reaction products. There is introduced into the mixer a suitable amount of disintegrated cellulose material and there is added thereto an approximately equal quantity of a water solution of a suitable salt such as a metal chloride, a sulphite, or any other substance which is capable under the conditions of the treatment of the mixer of increasing the copper number of the material. The copper number is a measure of the carbonyl groups in the material; that is, it measures the aldehyde and ketone groups present. The manner in which the copper numbers were determined for the purpose of the present invention is the Hagglund-Bertrand method as described in the book entitled "The Methods of Cellulose Chemistry" by Charles Dorée.

The amount and concentration of this solution may vary within wide limits. Ordinarily there is present in the solution from 1–10% of the metal salt. I have found that from 2½–5% thereof is ordinarily sufficient to obtain the desired result in a reasonable time. The solution is introduced, the mixer is closed and is then heated by means of the steam jacket for several hours, during which time a chemical change is effected as measured by the copper number. During the reaction acetic acid and other by-products are formed and are removed and condensed in the condenser together with water, which is vaporized during the process. In one such experiment, at the beginning of the operation the copper number of the material was in the neighborhood of 4, it had increased to about 13 or 14 at the end of the operation. While other investigators and other methods of determination may obtain copper numbers which are different from those given here, they illustrate the chemical changes which take place in the process.

The treated material is then transferred to a ball or pebble mill where water is added and the material is ground to a high degree of fineness so that substantially all of the same will pass through a 100 mesh screen. The resulting suspension is filtered on any suitable type of filter apparatus and the filter cake is thoroughly washed. The material is then dried on rotary driers or other suitable apparatus.

The dried material is then transferred to a ball mill for dry grinding. There is added to the material prior to the grinding aldehydes or ketones either as such or having certain substituted groups. Among such compounds are benzaldehyde, furfural, chlor-benzaldehyde, methyl ethyl ketone, and other substances of this class. I have found that when furfural is used, approximately 5% based upon the weight of the dried material is sufficient for my purpose. There may be added to the mixture filling materials such as fibres which impart desired properties to the mass. The amount of such fibres may vary within wide limits but I usually prefer to add from 25–50% based upon the weight of the dry material. I may add fibres of various types such as metal wool, mineral fibres, cellulose fibres, such as hemp, linters, wood meal or the like. There may also be added to the mixture at this step such substances as sodium acetate which in the resulting action causes the final product to be denser and which increases the velocity of the final hardening reaction.

It is often desirable to add fire resisting properties to the mixture and for this purpose such fibres as asbestos or the like may be added. In addition thereto I may add to the mixture certain carbonates which decompose at a high temperature liberating $CO_2$. Among such carbonates are zinc or iron carbonates, or mixtures thereof. The mixture of materials is sufficiently ground in the dry state so that the various constituents thereof become intimately mixed prior to the molding operation.

Molding of the prepared mixture

The mixture thus prepared is placed into suitable molds of special construction and there compressed at a relatively high pressure into the desired form. While the pressure may vary within a wide range, I have found that in order to obtain the best results the pressure should range between 2000 and 10,000 lbs. per square inch. Higher or lower pressures may be used, but in certain types of molds a pressure of approximately 5000 lbs. per square inch has been found suitable. Upon completion of the pressure stage the molds are then locked in order to retain the desired pressure.

Heat treatment of the molds

The molds are then transformed to an apparatus for the final heat treatment to harden the material in the mold. The apparatus generally consists of a tube or pipe of sufficient diameter to accommodate the molds and it is equipped with a roller conveyor to facilitate the insertion of the molds into the pipe. It is then closed at both ends and is connected with a vacuum pump and evacuated for a suitable period to remove gases from the molds. I have found that 30 minutes is usually a sufficient period for this purpose. Steam is then admitted at a pressure of from 50 to 150 lbs. per square inch. If superheated steam is used, lower pressures are suitable, it being desirable to maintain within the apparatus a temperature of approximately 175° C.

The molds are treated in the apparatus for a certain period of time during which a hardening of the articles takes place and a union thereof into a coherent, tough mass. The time varies with the size of the molded article, as for example, in molding a piece five inches thick I have found that the time of treatment should be from 6 to 8 hours.

The apparatus is then opened, the molds are removed therefrom and the molded articles ejected. It is not necessary to cool the molds prior to the removal of the moldings therefrom and no blistering of the moldings will take place. During the curing operation there is a definite shrinkage of the moldings and the steam pressure within the apparatus assists in maintaining the material in the proper shape until it is completely hardened.

The heat treatment resulted in one experiment, for example, in a decrease of the copper number of the final material to between 6 and 7.

Although I have described my invention setting forth a single embodiment thereof, it is to be understood that variations may be made in the procedure, in the materials used, and in the apparatus employed in the process. For example, other compounds than the metal salts specifically mentioned may be used for the first step of the process. I have found that other chlorides than zinc chloride are suitable, as for example, calcium chloride and the like. I may even use gaseous chlorine which is introduced into the mixer during the operation, or I may use a water solution of chlorine or a solution in organic solvents, such as carbon tetrachloride, etc. The concentration of the solution may be varied within wide limits. The higher the concentration of the salt or other substances used, the shorter will be the time necessary for the operation. When zinc chloride is used in this step it may be subsequently recovered by precipitating the same from the waste solution by means of soda ash or the like, to give zinc carbonate which may be used as a fire proofing material in a later stage of the operation.

Instead of conducting the operation in a mixing machine I may use an autoclave and boil the cellulosic material in contact with the solution under a suitable pressure, say from 25 pounds and up. The higher the pressure the less time will be required for the operation. In this case the amount of solution is generally several times the amount of the material being treated. A suitable proportion is from 25 to 40 kilos of the cellulosic material to about 300 liters of the solution.

In the heat treatment of the molds the heat may be produced under the pressure of substances other than water, such as alcohol, carbon tetrachloride, other chlorinated hydrocarbons, and the like, or solutions or liquids under pressure may be used. The heat treatment may also be accomplished in an oven with a circulation of hot air at a temperature of 150–200° C. for a prolonged period of time. I may also omit the addition of the aldehyde or ketone and still obtain good results in the heat hardening stage.

These and other changes may be made in my invention within the scope thereof and my invention is to be broadly construed and to be defined by the claims appended hereto.

What I claim is:—

1. A method of treating cellulosic material which comprises heating a mixture of a cellulosic material associated with those substances with which it occurs in nature in the presence of a substance which is capable of changing the chemical properties as measured by an increase in the copper number, mixing the product with a compound taken from the class consisting of aldehydes and ketones, and heating the mixture until cohesion throughout the mass has taken place.

2. A method of treating cellulosic material which comprises heating a mixture of a cellulosic material associated with those substances with which it occurs in nature in the presence of a substance which is capable of increasing the carbonyl groups present, for a sufficient time to substantially increase the copper number, mixing the product with a compound taken from the class consisting of aldehydes and ketones, and heating the mixture until cohesion throughout the mass has taken place.

3. A method of treating cellulosic material which comprises heating a mixture of a cellulosic material associated with those substances with which it occurs in nature in the presence of a substance which is capable of increasing the carbonyl groups present, for a sufficient time to substantially increase the copper number, mixing the product with a compound taken from the class consisting of aldehydes and ketones, and heating the mixture under a pressure of 2000–10,000 lbs. per square inch.

4. A method of treating cellulosic material which comprises subjecting to agitation and heating a mixture of a cellulosic material associated with lignin and the like in the presence of a substance which is capable of increasing the carbonyl groups present, for a sufficient time to substantially increase the copper number, mixing the product with a compound taken from the class consisting of aldehydes and ketones, and heating the mixture until the copper number has substantially decreased.

5. A method of treating cellulosic material which comprises heating a mixture of a cellulosic material associated with lignin and the like in the presence of a substance which is capable of increasing the carbonyl groups present, for a sufficient time to substantially increase the copper number, removing vapors produced, mixing the product with a compound taken from the class consisting of aldehydes and ketones, and heating the mixture until the copper number has substantially decreased.

6. A method of treating cellulosic material which comprises heating a mixture of a cellulosic material associated with lignin and the like in the presence of a substance which is capable of increasing the carbonyl groups present, for a sufficient time to substantially increase the copper number, grinding the material, mixing the product with a compound taken from the class consisting of aldehydes and ketones, and heating the mixture until the copper number has substantially decreased.

7. A method of treating cellulosic material which comprises heating a mixture of a cellulosic material associated with lignin and the like in the presence of a substance which is capable of increasing the carbonyl groups present, for a sufficient time to substantially increase the copper number, grinding the material, mixing a fibrous filler therewith, mixing the product with a compound taken from the class consisting of aldehydes and ketones, and heating the mixture until the copper number has substantially decreased.

8. A method of treating cellulosic material which comprises heating a mixture of a cellulosic material associated with lignin and the like in the presence of a substance which is capable of increasing the carbonyl groups present, for a sufficient time to substantially increase the copper number, mixing the product with a compound taken from the class consisting of aldehydes and ketones, adding a substance capable of accelerating the speed of the reaction and heating the mixture until the copper number has substantially decreased.

9. A method of treating cellulosic material which comprises heating a mixture of a cellulosic material associated with lignin and the like in the presence of a substance which is capable of increasing the carbonyl groups present, for a sufficient time to substantially increase the copper number, mixing the product with a compound taken from the class consisting of aldehydes and ketones, adding a substance capable of liberating $CO_2$ at high temperatures and heating the mixture until the copper number has substantially decreased.

10. A method of treating cellulosic material which comprises heating a mixture of a cellulosic material associated with lignin and the like in the presence of a substance which is capable of increasing the carbonyl groups present, for a sufficient time to substantially increase the copper number, mixing the product with furfural, and heating the mixture until the copper number has substantially decreased.

11. A method of treating cellulosic material which comprises heating a mixture of a cellulosic material associated with lignin and the like in the presence of a water solution of a substance which is capable of increasing the carbonyl groups present, for a sufficient time to substantially increase the copper number, mixing the product with a compound taken from the class consisting of aldehydes and ketones, and heating the mixture until the copper number has substantially decreased.

12. A method of treating cellulosic material which comprises heating a mixture of a cellulosic material associated with those substances with which it occurs in nature in the presence of a water solution of a metal salt for a sufficient time to substantially increase the copper number, mixing the product with a compound taken from the class consisting of aldehydes and ketones, and heating the mixture until cohesion throughout the mass has taken place.

13. A method of treating cellulosic material which comprises heating a mixture of a cellulosic material associated with lignin and the like in the presence of a water solution of a metal halide for a sufficient time to substantially increase the copper number, mixing the product with a compound taken from the class consisting of aldehydes and ketones, and heating the mixture until the copper number has substantially decreased.

14. A method of treating cellulosic material which comprises heating a mixture of a cellulosic material associated with lignin and the like in the presence of a water solution of zinc chloride for a sufficient time to substantially increase the copper number, mixing the product with a compound taken from the class consisting of aldehydes and ketones, and heating the mixture until the copper number has substantially decreased.

15. A method of treating cellulosic material which comprises heating a mixture of a cellulosic material associated with lignin and the like in the presence of a water solution of a metal salt for a sufficient time to substantially increase the copper number, mixing the product with a compound taken from the class consisting of aldehydes and ketones, placing the same under pressure in a mold, and heating the mixture until the copper number has substantially decreased.

16. A method of treating cellulosic material which comprises heating a mixture of a cellulosic material associated with lignin and the like in the presence of a water solution of a metal salt for a sufficient time to substantially increase the copper number, mixing the product with a compound taken from the class consisting of aldehydes and ketones, and heating the mixture under steam pressure until the copper number has substantially decreased.

17. A method of treating cellulosic material which comprises heating in an autoclave a mixture of a cellulosic material associated with lignin and the like in the presence of a water solution of a metal salt for a sufficient time to substantially increase the copper number, mixing the product with a compound taken from the class consisting of aldehydes and ketones, and heating the mixture until the copper number has substantially decreased.

18. A method of treating cellulosic material associated with the substances with which it occurs in nature which comprises heating the cellulosic material in the presence of a substance which is capable of changing the chemical properties of said material as measured by the copper number, washing the material thereby removing the substances which have caused the chemical change, drying the material, grinding the material, compressing the material thus obtained in molds at a pressure of at least 2000 lbs. per square inch, retaining in the molds the pressure applied, subjecting the material in the molds under the retained pressure to a vacuum treatment, subjecting the material in the molds so treated to a heat treatment within a steam autoclave at a pressure above the atmospheric pressure until cohesion throughout the mass has taken place.

19. A method of treating cellulosic material associated with the substances with which it occurs in nature which comprises heating the cellulosic material in the presence of a substance which is capable of changing the chemical properties of said material as measured by the copper number, washing the material thereby removing the substances which have caused the chemical change, drying the material, grinding the material, compressing the material thus obtained in molds at a pressure of at least 2000 lbs. per square inch, retaining in the molds the pressure applied, subjecting the material in the molds to a heat treatment within a steam autoclave at a pressure above the atmospheric pressure until cohesion throughout the mass has taken place.

20. A method of treating cellulosic material associated with substances with which it occurs in nature which comprises heating the cellulosic material in the presence of a substance which is capable of changing the chemical properties of said material as measured by the copper number, washing the material thereby removing the substances which have caused the chemical change, drying the material, grinding the material, compressing the material thus obtained in molds at a pressure of at least 2000 lbs. per square inch, retaining in the molds the pressure applied, subjecting the material in the molds under the retained pressure to a vacuum treatment, subjecting the material in the molds to a heat treatment in suitable apparatus until cohesion throughout the mass has taken place.

21. A method of treating cellulosic material associated with substances with which it occurs in nature which comprises heating the cellulosic material in the presence of a substance which is capable of changing the chemical properties of said material as measured by the copper number, washing the material thereby removing the substances which have caused the chemical change, drying the material, grinding the material, compressing the material thus obtained in molds at a pressure of at least 2000 lbs. per square inch, retaining in the molds the pressure applied, subjecting the material in the molds to heat treatment in suitable apparatus until cohesion throughout the mass has taken place.

22. A method of treating cellulosic material associated with substances with which it is associated in nature which comprises heating the cellulosic material in the presence of a substance which is capable of changing the chemical properties of said material as measured by the copper number, washing the material thereby removing the substances which have caused the chemical change, drying the material, grinding the material, adding thereto a substance capable of accelerating the reaction velocity, compressing the material thus obtained in molds at a pressure of at least 2000 lbs. per square inch, retaining in the molds the pressure applied, subjecting the material in the molds under the retained pressure to a vacuum treatment, subjecting the material in the molds so treated to a heat treatment within a steam autoclave at a pressure above the atmospheric pressure until cohesion throughout the mass has taken place.

23. A method of treating cellulosic material associated with substances with which it is associated in nature which comprises heating the cellulosic material in the presence of a substance which is capable of changing the chemical properties of said material as measured by the copper number, washing the material thereby removing the substances which have caused the chemical change, drying the material, grinding the material, adding thereto a substance capable of accelerating the reaction velocity, compressing the material thus obtained in molds at a pressure of at least 2000 lbs. per square inch, retaining in the molds the pressure applied, subjecting the material in the molds to a heat treatment within a steam autoclave at a pressure above the atmospheric pressure until cohesion throughout the mass has taken place.

24. A method of treating cellulosic material associated with substances with which it is associated in nature which comprises heating the cellulosic material in the presence of a substance which is capable of changing the chemical properties of said material as measured by the copper number, washing the material thereby removing the substances which have caused the chemical change, drying the material, adding thereto a substance capable of accelerating the reaction velocity, compressing the material thus obtained in molds at a pressure of at least 2000 lbs. per square inch, retaining in the molds the pressure applied, subjecting the material in the molds under the retained pressure to a vacuum treatment, subjecting the material in the molds so treated to a heat treatment in suitable apparatus until cohesion throughout the mass has taken place.

25. A method of treating cellulosic material associated with substances with which it occurs in nature which comprises heating the cellulosic material in the presence of a substance which is capable of changing the chemical properties of said material as measured by the copper number, washing the material thereby removing the substances which have caused the chemical change, drying the material, grinding the material, adding thereto a substance capable of accelerating the reaction velocity, compressing the material thus obtained in molds at a pressure of at least 2000 lbs. per square inch, retaining in the molds the pressure applied, subjecting the material in the molds to a heat treatment in suitable apparatus until cohesion throughout the mass has taken place.

MAX HENKELS.